US011375093B2

(12) United States Patent
Zhuo et al.

(10) Patent No.: US 11,375,093 B2
(45) Date of Patent: Jun. 28, 2022

(54) OPTICAL MEMBER DRIVING DEVICE, CAMERA DEVICE, AND ELECTRONIC APPARATUS

(71) Applicant: New Shicoh Motor Co. Ltd., Zhejiang (CN)

(72) Inventors: Yingji Zhuo, Zhejiang (CN); Wei Sun, Zhejiang (CN)

(73) Assignee: NEW SHICOH MOTOR CO. LTD., Zhejiang (CN)

( * ) Notice: Subject to any disclaimer, the term of this patent is extended or adjusted under 35 U.S.C. 154(b) by 0 days.

(21) Appl. No.: 17/073,855

(22) Filed: Oct. 19, 2020

(65) Prior Publication Data

US 2021/0120153 A1    Apr. 22, 2021

(30) Foreign Application Priority Data

Oct. 18, 2019   (CN) .......................... 201910991907.1

(51) Int. Cl.
   *H04N 5/225*   (2006.01)
   *H04M 1/02*   (2006.01)
   *G02B 7/09*   (2021.01)

(52) U.S. Cl.
   CPC ............. *H04N 5/2254* (2013.01); *G02B 7/09* (2013.01); *H04M 1/0264* (2013.01)

(58) Field of Classification Search
   CPC ..... H04N 5/2254; H04M 1/0264; G02B 7/09; G02B 7/08; G02B 27/646; G02B 7/026; G03B 13/36
   See application file for complete search history.

(56) References Cited

U.S. PATENT DOCUMENTS

| 10,036,897 | B2 | 7/2018 | Ladwig |
| 10,067,357 | B2 | 9/2018 | Ladwig |
| 2011/0107758 | A1* | 5/2011 | Kotanagi ................ F03G 7/065 60/528 |
| 2019/0136839 | A1* | 5/2019 | Miller ...................... G03B 3/10 |

FOREIGN PATENT DOCUMENTS

CN    108174104  A    6/2018

OTHER PUBLICATIONS

Office Action dated Dec. 7, 2021 in co-pending India Application No. 202024044775.

\* cited by examiner

*Primary Examiner* — Mekonnen D Dagnew
(74) *Attorney, Agent, or Firm* — Hayes Soloway P.C.

(57) ABSTRACT

An optical member driving device is described that includes a fixed portion having a plate-like base with a through hole, a movable portion having a spring plate to place an optical member on it, and a SMA driving portion having a SMA wire and driving the movable portion. The spring plate has a spring plate main body and two arm portions extending from the spring plate main body and fixed on a plate surface of the base. The spring plate main body is entirely located inside the through hole when viewed from a normal direction of the plate surface.

16 Claims, 9 Drawing Sheets

OPTICAL MEMBER DRIVING DEVICE, CAMERA DEVICE, AND ELECTRONIC APPARATUS

CROSS-REFERENCE TO RELATED APPLICATION

This application claims the priority to Chinese patent application CN201910991907.1, filed on Oct. 18, 2019, the contents of which are incorporated herein by reference herein.

TECHNICAL FIELD

The present invention relates to an optical member driving device used in electronic apparatus such as smartphones, a camera device, and an electronic apparatus.

BACKGROUND

Various camera devices equipped with OIS (Optical Image Stabilizer) function have been proposed. As a document disclosing a technique related to this type of device, Chinese patent No. 108174104 (hereinafter referred to as "Patent Document 1") can be taken. The imaging device disclosed in Patent Document 1 is a device in which an OIS base, which is a fixed portion, and a lead, which is a movable portion supporting the lens, are connected and integrated via two pairs of SMA (Shape Memory Alloy) wires which contract in the X-axis and Y-axis directions due to heat generation caused by electric current. This imaging device realizes hand shake correction by controlling the supply of electric current to the SMA wire.

However, the technique of Patent Document 1 has a problem that the width in the Z-axis direction becomes thick, since in its constitution the OIS base and the lead are laminated in the Z-axis direction, which is the optical axis direction

SUMMARY

In accordance with a first aspect of the present disclosure, there is provided an optical member driving device including: a fixed portion having a plate-like base with a through hole; a movable portion having a spring plate for placing an optical member; and a SMA driving portion having a SMA wire and driving the movable portion. The spring plate has a spring plate main body and two arm portions extending from the spring plate main body and fixed on a plate surface of the base. The spring plate main body is entirely located inside the through hole when viewed from a normal direction of the plate surface.

In accordance with a second aspect of the present disclosure, there is provided a camera device including the optical member driving device described above, a lens assembly as the optical member, an AF lens assembly allowing light from a subject to pass through, and an image sensor receiving light having passed through the AF lens assembly. The lens assembly is arranged between the subject and the AF lens assembly.

In accordance with a third aspect of the present disclosure, there is provided a camera device including the optical member driving device described above, a lens assembly as the optical member, an AF lens assembly allowing light from a subject to pass through, and an image sensor receiving light having passed through the AF lens assembly. The lens assembly is arranged between the AF lens assembly and the image sensor.

In accordance with a fourth aspect of the present disclosure, there is provided a camera device including the optical member driving device described above, an AF lens body allowing light from a subject to pass through, and an image sensor as the optical member receiving light having passed through the AF lens body.

In accordance with a fifth aspect of the present disclosure, there is provided an electronic apparatus including the camera device described above.

DETAILED DESCRIPTION

Figure 1A:
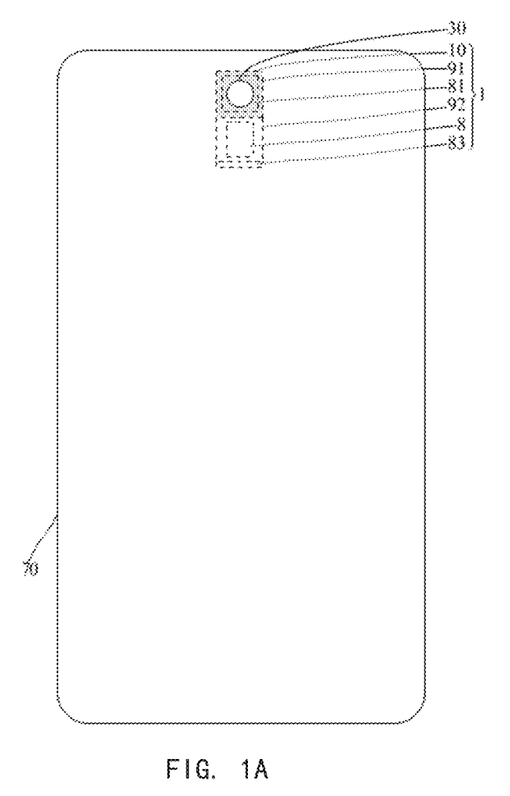
FIG. 1A is a front view of a smartphone which is an electronic apparatus mounted with a camera device including an OIS lens driving device which is an optical member driving device according to an embodiment of the present invention.
Figure 1B:
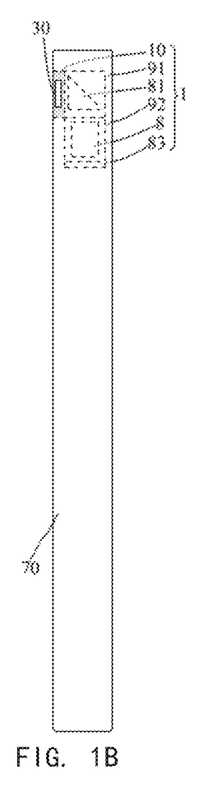
FIG. 1B is a side view of the smartphone shown in FIG. 1A.

Hereinafter, embodiments of the present disclosure are explained with reference to drawings. As shown in FIGS. 1A and 1B, the camera device 1 is accommodated in the housing of the smartphone 70. The camera device 1 includes: an OIS lens assembly 3 and an AF lens assembly 8 which are optical members; a prism 81 which is an optical path bending element; an image sensor 83 which is a photoelectric conversion element; an OIS lens driving device 10 to drive the OIS lens assembly 3; a prism device 91 to accommodate the prism 81; and an AF lens driving device 92 to drive the AF lens assembly 8. OIS is an abbreviation for Optical Image Stabilization. AF is an abbreviation for Autofocus.

Hereinafter, the optical axis direction along the optical axis of the OIS lens body 30 of the OIS lens assembly 3 is appropriately referred to as a Z direction, one direction orthogonal to the Z direction is appropriately referred to as an X direction, and a direction orthogonal to both the Z direction and the X direction is appropriately referred to as a Y direction. Further, the +Z side of the optical axis of the OIS lens body 30, which is the side of the subject, may be referred to as a front side, and the −Z side, which is the side on which the prism 81 on the opposite side of the subject is provided, may be referred to as a rear side. Further, the +Y side may be referred to as an upper side, the −Y side may be referred to as a lower side, the +X side may be referred to as a left side, and the −X side may be referred to as a right side.

Figure 2:
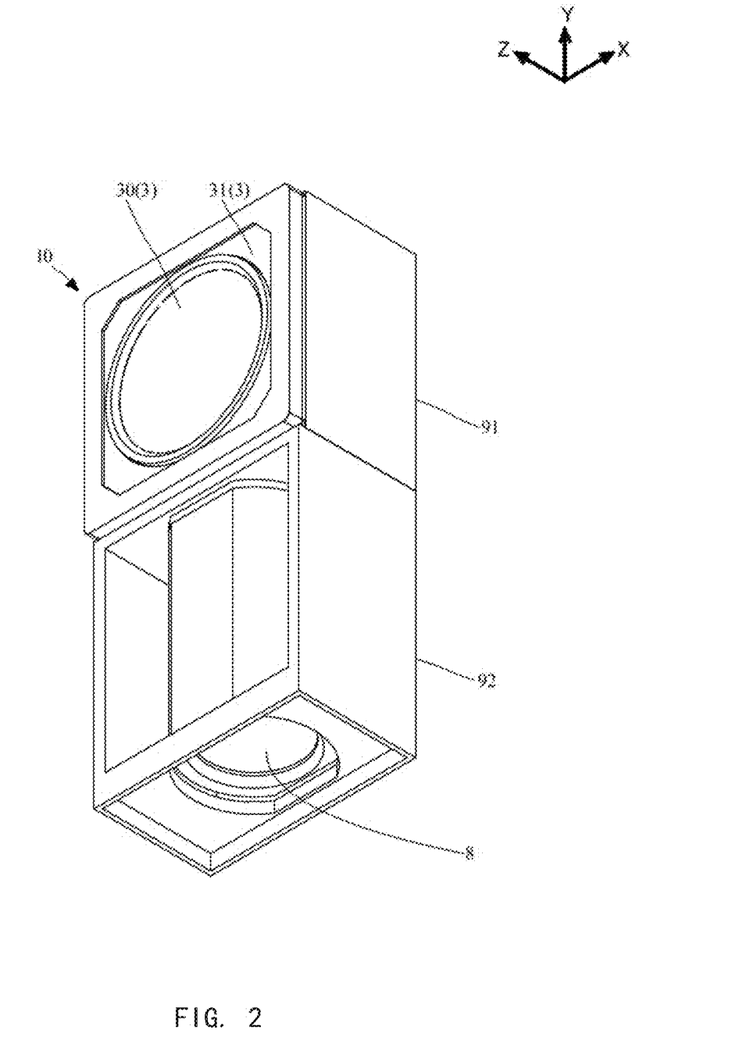
FIG. 2 is a perspective view of the camera device in FIGS. 1A and 1B.
Figure 3:
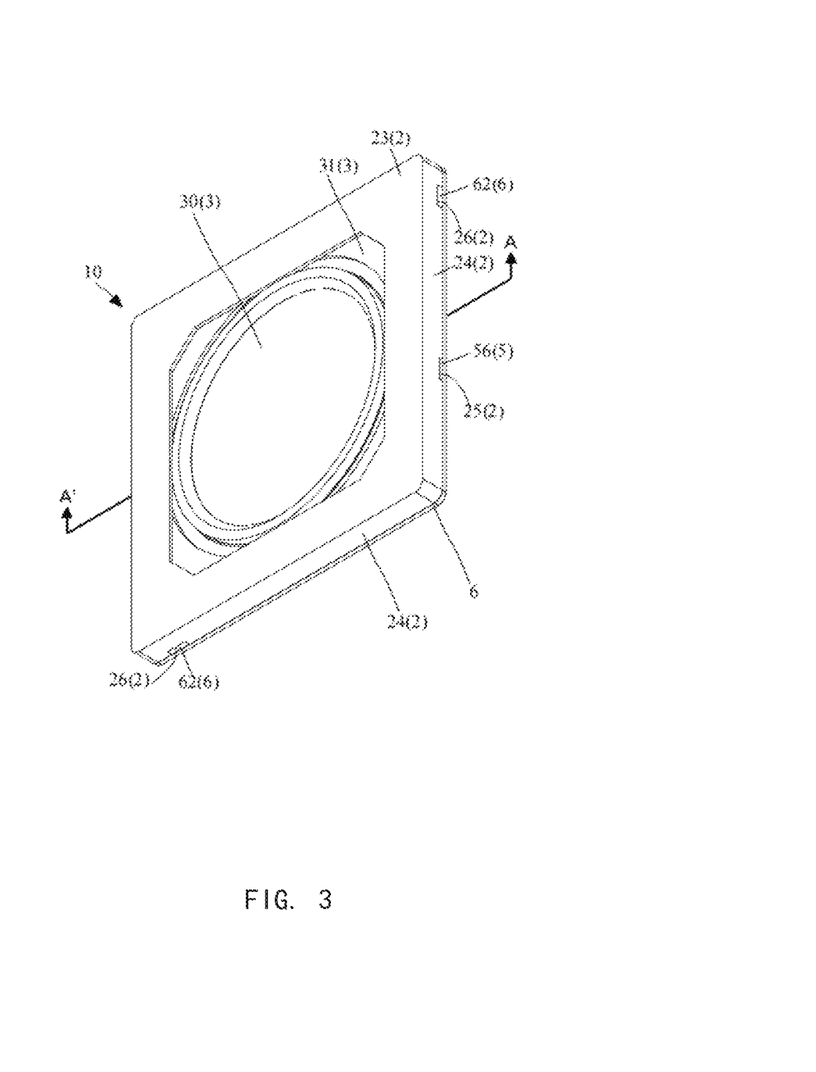
FIG. 3 is a perspective view of the OIS lens driving device in FIG. 2.

As shown in FIG. 1A, FIG. 1B, and FIG. 2, in the camera device 1, the prism device 91 is arranged on the rear side of the OIS lens driving device 10, and the AF lens driving device 92 is arranged on the lower side of the prism device 91. The OIS lens driving device 10 supports the OIS lens assembly 3. A prism 81 is arranged in the prism device 91, the incident surface thereof faces an OIS lens assembly 3, and the emission surface thereof faces an AF lens assembly 8. In the AF lens driving device 92, the AF lens assembly 8 is arranged so that the direction along the optical axis of the AF lens body becomes Y direction. An image sensor 83 is arranged on the lower side of the AF lens driving device 92. The light from the subject passes through the OIS lens assembly 3 and is reflected downward by the prism 81. The light reflected by the prism 81 passes through the AF lens assembly 8 and is converged on the image sensor 83. The image sensor 83 photoelectrically photoelectrically converts the light and outputs the converted signal as an image signal. The camera device 1 is required to reduce the dimension in the Z direction so that the dimension in the Z direction, which is the thickness direction of the smartphone 70, is reduced. Therefore, it is also required to reduce the thickness of the OIS lens driving device 10, which is the dimension in the Z direction.

As shown in FIG. 3 to FIG. 6, the OIS lens driving device 10 includes a casing 2, a SMA driving portion 4, a spring plate 5, and a base 6. The details of the configuration of each portion will be described below. An accommodation space is formed by the casing 2 and the base 6 and accommodates the SMA driving portion 4, the spring plate 5, and the OIS lens assembly 3.

Figure 5:
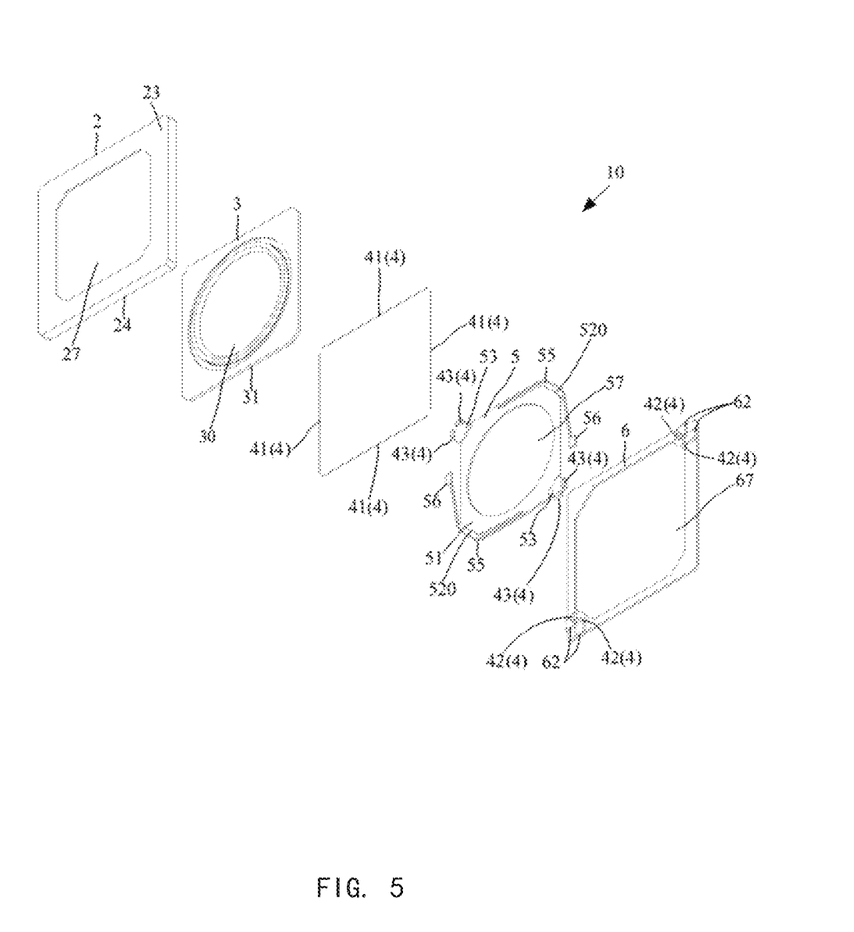
FIG. 5 is an exploded perspective view of the OIS lens driving device in FIGS. 1A and 1B.
Figure 6:
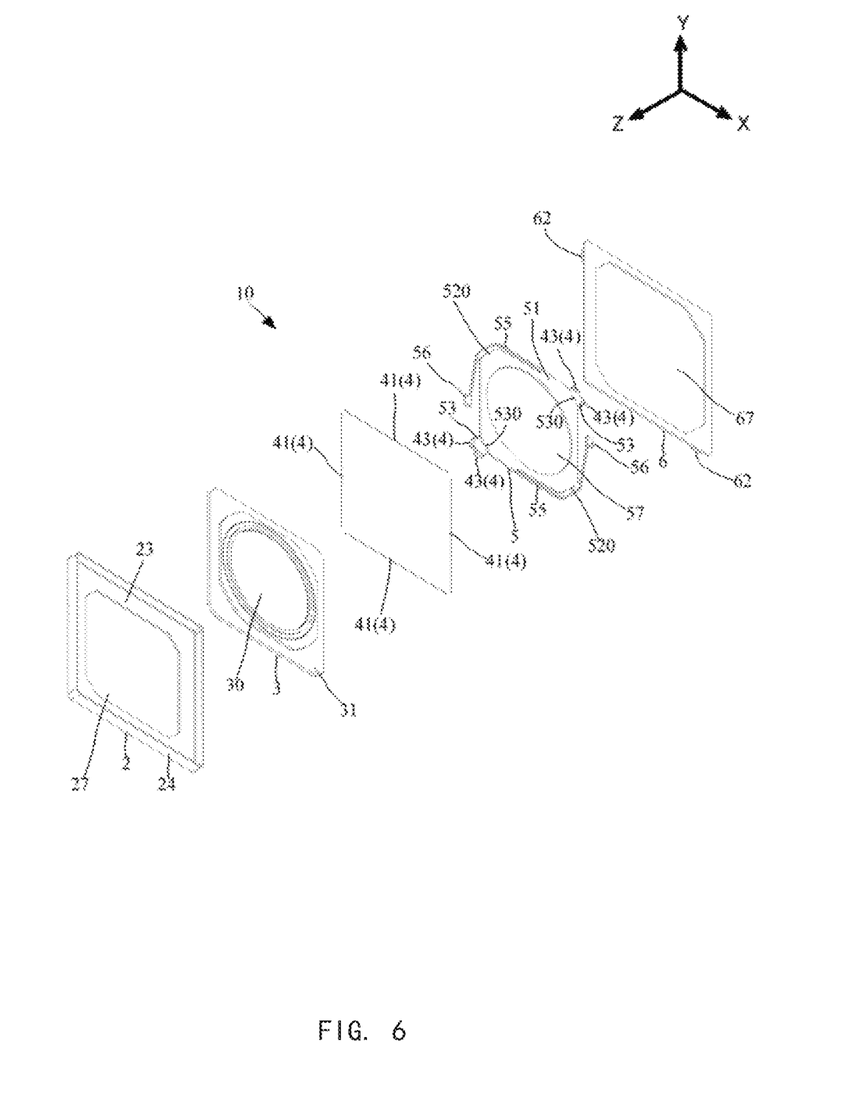
FIG. 6 is an exploded perspective view of the OIS lens driving device in FIGS. 1A and 1B viewed from another viewpoint.
Figure 7:
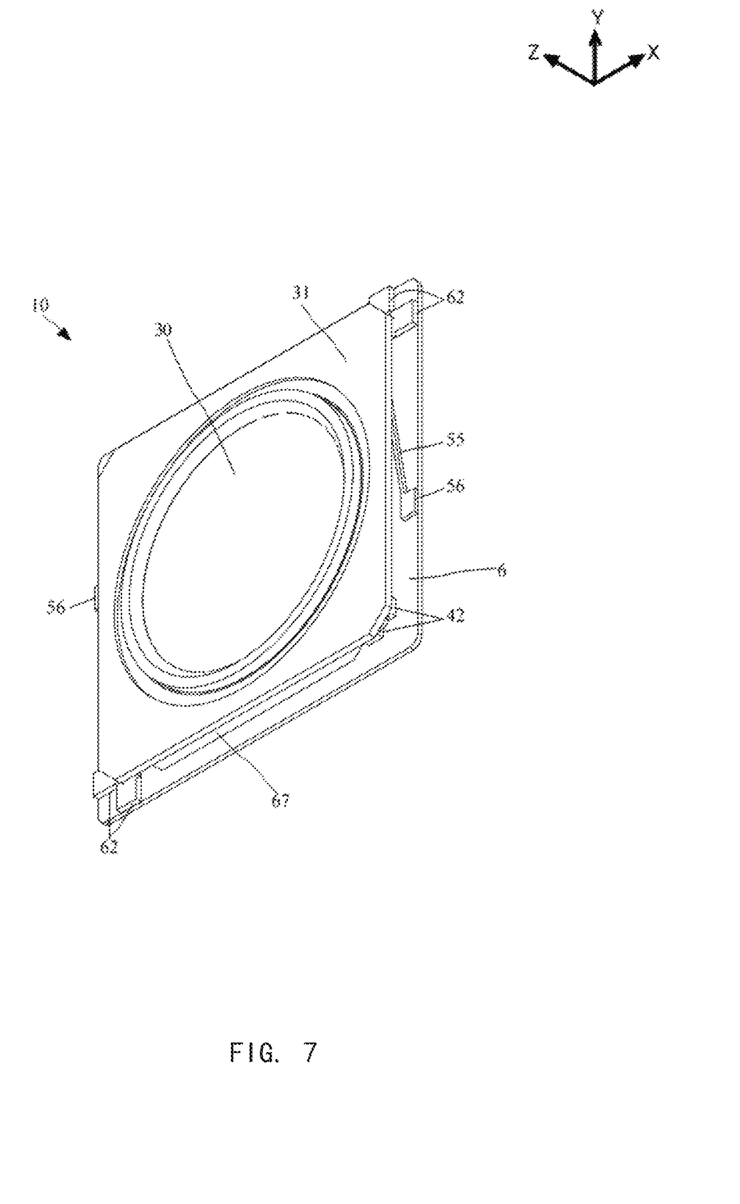
FIG. 7 is a diagram in which the casing is removed from FIG. 3.
Figure 8:
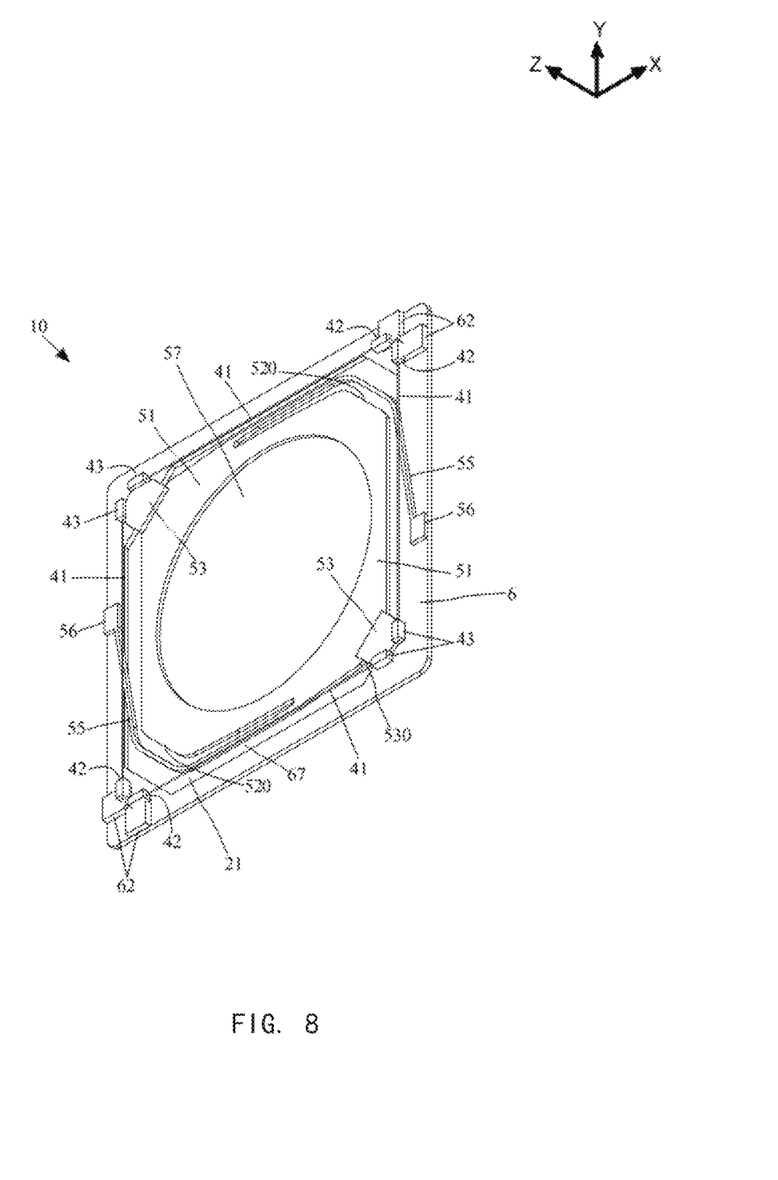
FIG. 8 is a diagram in which the OIS lens assembly is removed from FIG. 7.

The casing 2 has a square-shaped front wall 23 and a side wall 24 slightly extending backward from the periphery of the front wall 23 to form a box-like body, and is provided with a through hole 27 at the center of the front wall 23. The through hole 27 has such a shape that four corners of a square have been removed. A plurality of recessed portions 25, 26 recessed on the front side are provided at the rear end of the side wall 24. The OIS lens assembly 3 has an OIS lens body 30 which is a main body thereof and is an optical member main body, and a flange portion 31 provided around the OIS lens body 30. The flange portion 31 is a square plate with a perfect circular hole in the center, and the OIS lens body 30 is fixed to the inner circumference of this hole.

The SMA driving portion 4 has a SMA wire 41 extending in one direction, and a fixed-side end portion 42 and a movable-side end portion 43 on both sides thereof. One end and the other end of the SMA wire 41 are respectively fixed to the fixed-side end portion 42 and the movable-side end portion 43. Further, the fixed-side end portion 42 and the movable-side end portion 43 are formed of a conductive material, and serve as electric connection portions when electric current is applied to the SMA wire 41.

The spring plate 5 has a main body portion 51 with an approximately square outer shape and two arm portions 55 extending outward from two parallel end edges of the main body portion 51. A through hole 57 is provided in the center of the main body portion 51. The four corners of the main body portion 51 are cut out as notches 520 and 530 at each diagonal portion.

The arm portion 55 protrudes from the base end at a position on the side close to the notch 530 at the end edge in the X-direction of the main body portion 51, extends to the notch 520 along the end edge in the X-direction, turns around the outside of the notch 520 to bend toward the side of the end edge in the Y-direction, and extends toward a direction outwardly away from the end edge. The tip end of the arm portion 55 is provided with a connection piece 56.

The first pin 53 is provided in the notch 530 so as to protrude diagonally outward from the main body portion 51. The first pin 53 has a pentagonal shape. The first pin 53 is integrally formed with the main body portion 51 of the spring plate 5.

The base 6 has a rectangular plate-like shape. A through hole 67 is provided in the center of the base 6. The through hole 67 has such a shape that four corners of a square have been removed. Two second pins 62 are respectively provided in the upper right corner and the lower left corner of the front surface of the base 6. The second pin 62 has a rectangular plate-like shape and one end surface thereof is substantially flush with the outer end surface of the base 6.

Of the members described above, the casing 2 and the base 6 form a fixed portion, the spring plate 5 and the OIS lens assembly 3 form a movable portion which is movable relative to the fixed portion. The fixed portion and the movable portion are connected via four SMA driving portions 4.

Figure 9:
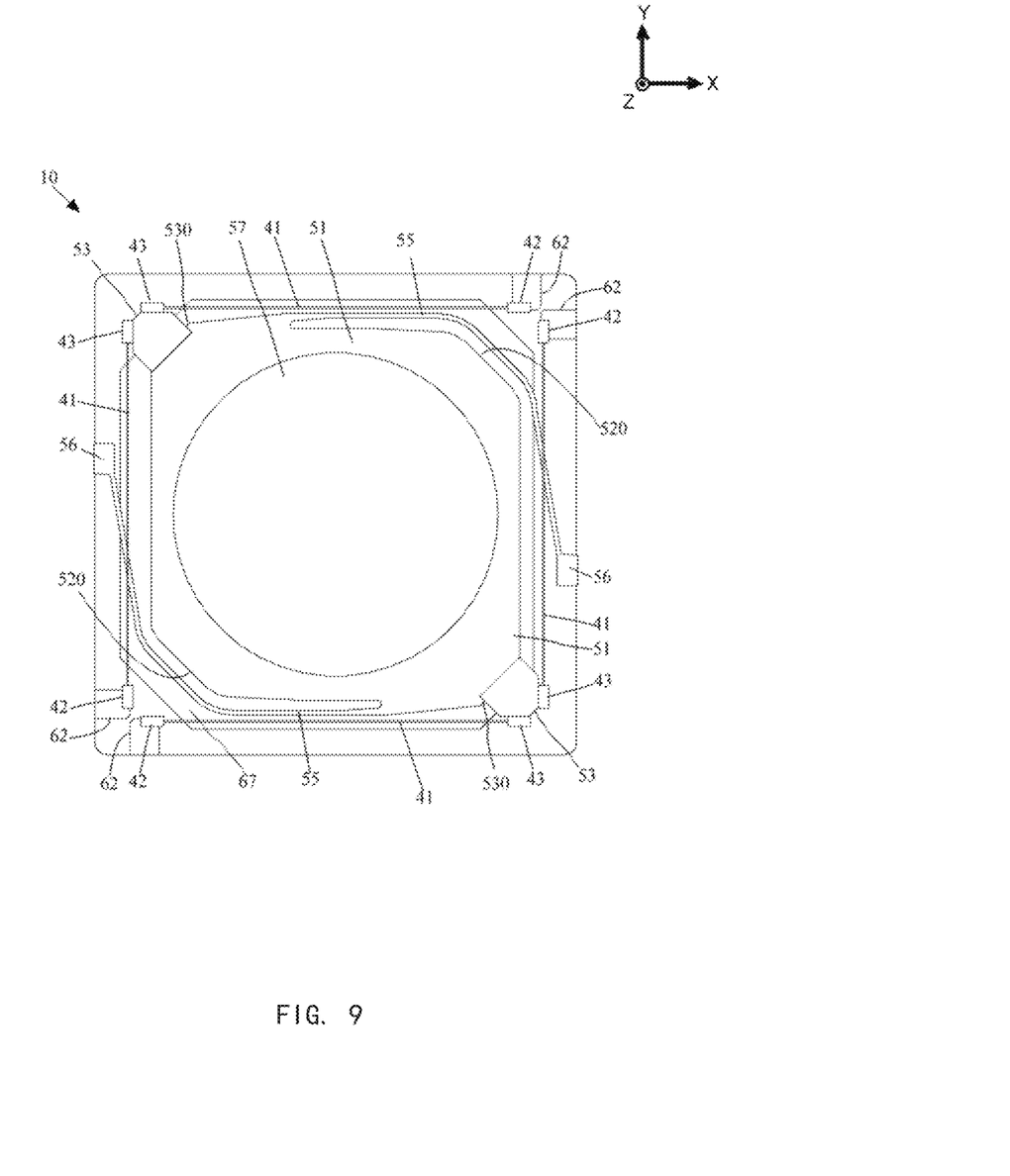
FIG. 9 is a diagram of FIG. 8 viewed from a +Z side.

It will be described in more detail. The rear end portion of the side wall 24 of the casing 2 is joined to the circumference of the front surface of the base 6. The spring plate 5 is arranged on the front surface of the base 6 in a narrow space surrounded by the casing 2 and the base 6. As shown in FIG. 9, the main body portion 51 of the spring plate 5 is entirely located inside the through hole 67 when viewed from the normal direction of the plate surface. The two first pins 53 of the spring plate 5 project out to the outside of the corner cut portion of the through hole 67 of the base 6, and the portion which has projected out overlaps with the base 6, but is not in contact with the base 6 in the present embodiment. The OIS lens assembly 3 is supported by placing the flange portion 31 on the main body portion 51.

The arm portion 55 of the spring plate 5 projects out to the outside of the through hole 67 of the base 6, and the connection piece 56 at the tip end of the arm portion 55 is bonded to the front surface of the base 6. The end surface on the outer side of the connection piece 56 is fixed so as to be substantially flush with the end surface of the outer shape of the base 6, and is exposed to the outside via the recessed portion 25 of the casing 2. Further, the end surface on the outer side of the second pin 62 is also exposed to the outside via the recessed portion 26 of the casing 2. The elastic force of the two arm portions 55 of the spring plate 5 is balanced at the position where the main body portion 51 is in the center of the through hole 57. This position is referred to as initial position. Since the arm portion 55 extends in approximately X-direction and Y-direction, the main body portion 51 can move in the in-plane direction of XY. Further, since it is smaller than the through hole 67, it can move with a small driving force without contacting with the base 6.

Figure 4:
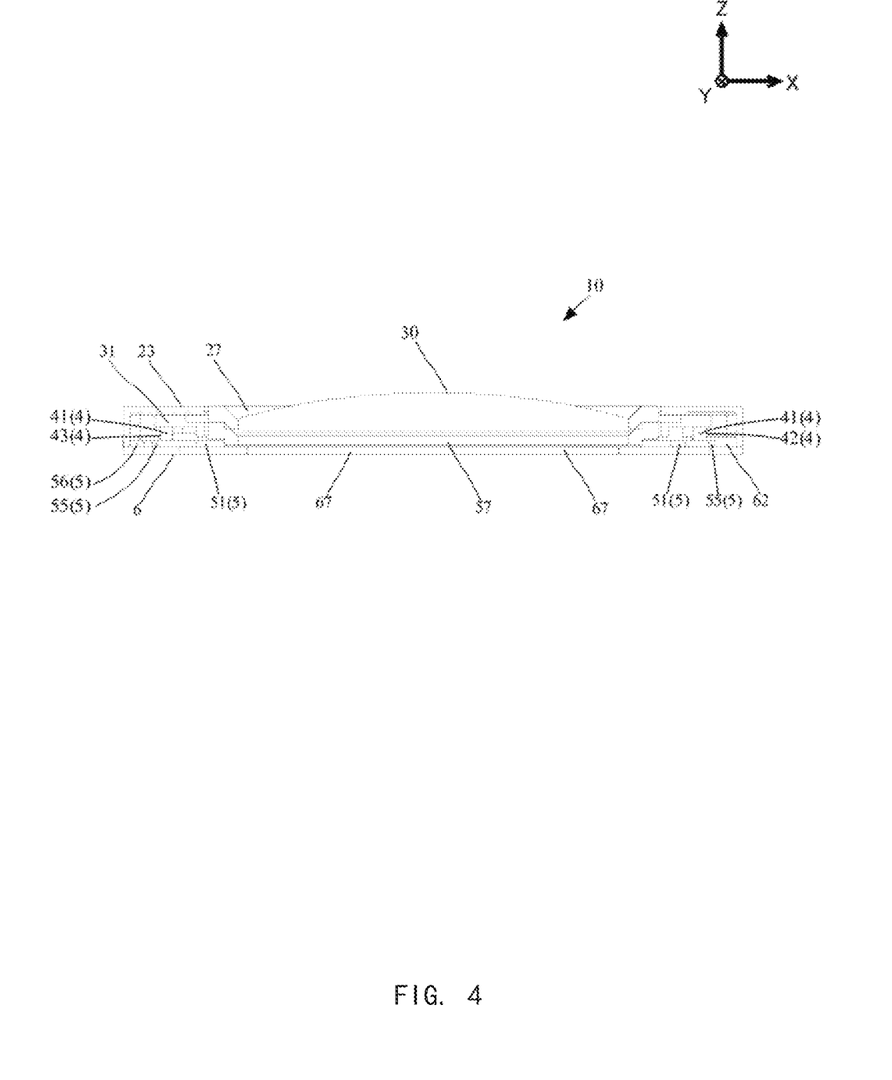
FIG. 4 is a cross-sectional view taken along line A-A of FIG. 3.

The four SMA driving portions 4 are arranged along respective end edges of the base 6 on the front surface side of the base 6. The fixed-side end portion 42 of the SMA driving portion 4 is provided on the second pin 62. The movable-side end portion 43 of the SMA driving portion 4 is provided on the first pin 53. As shown in FIG. 4, the SMA wire 41 of the SMA driving portion 4 is located in front of the main body portion 51 and the arm portion 55 of the spring plate 5 in the normal direction of the plate surface of the spring plate 5.

Four second pins 62 and two connection pieces 56 are connected to an external power source. Thereby, an electric current path of the external power source→the second pin 62→the fixed-side end portion 42→the SMA wire 41→movable-side end portion 43→the first pin 53→the main body portion 51→the arm portion 55→the connection piece 56→the external power source is formed, and electric current is supplied to the SMA wire 41. In each of the four SMA driving portions 4, the SMA wire 41 contracts due to heat generated by being supplied with electric current and drives the movable portion. As for the movable portion, the main body portion of the spring plate 5 on which the OIS lens assembly 3 has been placed moves in the in-plane direction of XY.

The above description is the details of the configuration of the present embodiment. The OIS lens driving device 10, which constitutes the optical member driving device of the present embodiment, includes a fixed portion having plate-like base 6 with a through hole 67; a movable portion having a spring plate 5 for placing an optical member; and a SMA driving portion 4 having a SMA wire 41 and driving the movable portion. The spring plate 5 has a main body portion 51 of the spring plate 5 and two arm portions 55 extending from the main body portion 51 of the spring plate 5 and fixed on a plate surface of the base 6. The main body portion 51 of the spring plate 5 is entirely located inside the through hole 67 when viewed from a normal direction of the plate surface. Therefore, the thickness of the OIS lens driving device 10 excluding the casing 2 in the optical direction is the thicknesses of the base 6, of the spring plate 5 and of the SMA driving portion 4 only, and can be reduced. Therefore, according to the present embodiment, it is possible to provide an optical member driving device, a camera device, and an electronic apparatus in which the width thereof in the optical axis direction are small.

It is to be noted that, in the embodiment described above, SMA wires 41 of four SMA driving portions 4 may be provided at the same height as the spring plate 5 in a normal direction of the plate surface of the spring plate 5. For example, if the SMA wire 41 of the SMA driving portion 4 is laid between the main body portion 51 and the arm portion 55 on the side where the connection piece 56 is located, the SMA wire 41 can be arranged at the same height as the spring plate 5 without interfering with the arm portion 55 and the SMA wire 41. With such a configuration, the width of the optical member driving device in the optical direction can be further reduced. In addition, the floating of the spring plate 5 can be suppressed.

Further, in the above embodiment, the number of the SMA wires 41 of each of the four SMA driving portions 4 is set to two, and these two SMA wires 41 may be provided on both the front side and the rear side of the spring plate 5 in the normal direction of the plate surface of the spring plate 5. The force that the SMA wire 41 pulls the spring plate 5 forward and the force that the SMA wire 41 pulls the spring plate 5 backward are counterbalanced. Therefore, the floating of the spring plate 5 can be suppressed.

Further, in the above embodiment, the movable portion or the OIS lens assembly 3 on the movable portion may be slid with a sliding portion provided on the rear surface of the front wall 23 of the casing 2. Further, the flange portion 31 may be slid with the fixed-side end portion 42 of the SMA driving portion 4 or another fixed portion. Further, the first pin 53 or the movable-side end portion 43 of the SMA driving portion 4 may be slid with respect to the base 6.

Further, in the above embodiment, the OIS lens assembly 3 is arranged between the subject and the AF lens assembly 8. In this embodiment, a prism 81 is further arranged between the OIS lens assembly 3 and the AF lens assembly 8. The OIS lens assembly 3 may be configured to be arranged between the AF lens assembly 8 and the image sensor 83.

Further, in the above embodiment, the OIS lens body 30 is used as an optical member, and the optical member driving device is for driving the OIS lens assembly 3, but the image sensor 83 may be used as the optical member, and the optical member driving device may drive the image sensor 83. That is, the OIS lens assembly 3 may be eliminated, and a combination of the AF lens assembly 8 and the AF lens driving device 92 for focus adjustment, and the image sensor 83 and the optical member driving device for hand shake correction may be used.

What is claimed is:

1. An optical member driving device, comprising: a fixed portion comprising a plate-like base with a through hole; a movable portion comprising a spring plate for placing an optical member including at least an OIS (Optical Image Stabilizer) lens assembly; and a SMA (Shape Memory Alloy) driving portion which comprises a SMA wire and drives the movable portion in a direction orthogonal to the direction along the optical axis of an OIS lens body of the OIS lens assembly, wherein the spring plate comprises a spring plate main body, and two arm portions extending in the direction orthogonal to the direction along the optical axis of an OIS lens body from the spring plate main body and fixed on a plate surface of the base, and the spring plate main body is entirely located inside the through hole when viewed from a normal direction of the plate surface.

2. The optical member driving device according to claim 1, wherein the spring plate comprises a first pin protruding outward from the spring plate main body, and a movable-side end portion of the SMA driving portion is provided on the first pin.

3. The optical member driving device according to claim 2, wherein the first pin is integrally formed with the spring plate.

4. The optical member driving device according to claim 2, wherein the first pin or the movable-side end portion of the SMA driving portion slides with respect to the base.

5. The optical member driving device according to claim 1, wherein parts of the two arm portions fixed to the base are exposed to outside.

6. The optical member driving device according to claim 1, wherein a fixed-side end portion of the SMA driving portion is provided on a second pin provided on the base, and the second pin is exposed to the outside.

7. The optical member driving device according to claim 1, wherein the optical member comprises an optical member main body and a flange portion provided around the optical member main body, the flange portion slides with the fixed-side end portion of the SMA driving portion.

8. The optical member driving device according to claim 1, wherein the SMA wire of the SMA driving portion is provided at a same height as the spring plate in a normal direction of the plate surface of the spring plate.

9. The optical member driving device according to claim 1, wherein both sides of the spring plate are provided with the SMA wires of the SMA driving portion in a normal direction of the plate surface of the spring plate.

10. The optical member driving device according to claim 1, wherein the fixed portion further comprises a casing, and the movable portion or the optical member on the movable portion slides with a sliding portion provided on a rear surface of a front wall of the casing.

11. A camera device, comprising:
the optical member driving device according to claim 1;

the OIS lens assembly as the optical member;

an AF lens assembly as the optical member allowing light from a subject to pass through; and an image sensor receiving light having passed through the AF lens assembly, wherein the OIS lens assembly is arranged between the subject and the AF lens assembly.

12. The camera device according to claim 11, wherein an optical path bending element is arranged between the lens assembly and the AF lens assembly.

13. An electronic apparatus comprising the camera device according to claim 11.

14. A camera device, comprising:

the optical member driving device according to claim 1;

the OIS lens assembly as the optical member;

an AF lens assembly as the optical member allowing light from a subject to pass through; and an image sensor receiving light having passed through the AF lens assembly, wherein the OIS lens assembly is arranged between the AF lens assembly and the image sensor.

15. A camera device comprising:

the optical member driving device according to claim 1;

an AF lens body allowing light from a subject to pass through; and an image sensor as the optical member receiving light having passed through the AF lens body.

16. An optical member driving device, comprising:

a fixed portion comprising a plate-like base with a through hole;

a movable portion comprising a spring plate for placing an optical member; and a SMA driving portion which comprises a SMA wire and drives the movable portion in a direction orthogonal to the direction along the optical axis of a lens body of the optical member, wherein the spring plate comprises a spring plate main body, and two arm portions extending in the direction orthogonal to the direction along the optical axis of a lens body of the optical member from the spring plate main body and fixed on a plate surface of the base, and the spring plate main body of the movable portion is entirely located inside the through hole of the fixed portion when viewed from a normal direction of the plate surface.

* * * * *